Patented Dec. 18, 1934

1,984,759

UNITED STATES PATENT OFFICE 1,984,759

REFRACTORY MATERIAL

Bernard J. Patton, deceased, late of Cleveland, Ohio, by Josephine V. Patton, administratrix, Cleveland, Ohio No Drawing. Application November 21, 1931, Serial No. 576,621

1 Claim. (Cl. 22—188)

This invention relates to refractory materials, one of the objects being to provide a material suitable for application to the hot-tops of molds for ingots and the like and which will withstand the high temperatures and rough usage incidental to such use.

This material, before being rendered plastic for application to hot-tops, consists of chrome ore, basic slag, magnesite, calcined fire clay, plastic clay and common fire clay. The calcined fire clay is largely in excess of the other substances in the mix, while it and the plastic clay and common clay form substantially three-quarters of the mix. These substances are all mixed together and rendered plastic by the addition of sufficient water, this mix being then run into the metal casting of the hot tops around cores previously placed therein. After setting, these cores are removed and heat is supplied to bake the material hard. The molds are then ready for use. After the formation of ingots therein and the stripping of these molds the material may be patched by the addition of further material applied to any cracks, in a plastic state, so that a smooth interior surface is maintained. The above reference to "common" fire clay is intended to distinguish untreated or uncalcined fire clay from calcined fire clay. This term will also be used throughout the remainder of this specification.

Preferably, the previously named substances are mixed in the following proportions:

|  | Per cent |
|---|---|
| Chrome ore | 9.35 |
| Basic slag | 3.37 |
| Magnesite | 11.20 |
| Calcined fire clay | 42.85 |
| Plastic clay | 14.02 |
| Common fire clay | 19.21 |

It is to be understood that plastic clay differs from common clay in that it is lower in silica and higher in alkalis and iron oxid, and that the term "plastic" does not necessarily refer to its physical characteristics after mixing with water.

Although specific proportions have been given as preferably it is possible to make this new refractory material without adhering exactly thereto, the following table giving the permissible range for the various substances:

|  | Per cent |
|---|---|
| Chrome ore | 8 to 10 |
| Basic slag | 2 to 5 |
| Magnesite | 10 to 12 |
| Calcined fire clay | 50 to 30 |
| Plastic clay | 10 to 15 |
| Common fire clay | 20 to 28 |

What is claimed is:

A refractory material for application to the hot-tops of ingot molds, consisting of from 8 to 10 per cent. chrome ore, 2 to 5 per cent. basic slag, 10 to 12 per cent. magnesite, 50 to 30 per cent. calcined fire clay, 10 to 15 per cent. plastic clay and 20 to 28 per cent. common fire clay.

JOSEPHINE V. PATTON,
Administratrix of the Estate of Bernard J. Patton, Deceased.